(12) United States Patent
Srinivasan et al.

(10) Patent No.: US 9,292,923 B2
(45) Date of Patent: Mar. 22, 2016

(54) METHODS, APPARATUS AND ARTICLES OF MANUFACTURE TO MONITOR ENVIRONMENTS

(71) Applicant: THE NIELSEN COMPANY (US), LLC, New York, NY (US)

(72) Inventors: Venugopal Srinivasan, Palm Harbor, FL (US); Padmanabhan Soundararajan, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 21 days.

(21) Appl. No.: 13/787,314

(22) Filed: Mar. 6, 2013

(65) Prior Publication Data

US 2014/0254880 A1 Sep. 11, 2014

(51) Int. Cl.
*G06T 7/00* (2006.01)
*G06K 9/00* (2006.01)

(52) U.S. Cl.
CPC ............ *G06T 7/004* (2013.01); *G06K 9/00335* (2013.01); *G06T 2207/10016* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 5,550,928 A * | 8/1996 | Lu et al. .................... | 382/116 |
| 7,518,631 B2 | 4/2009 | Hershey et al. | |
| 7,620,202 B2 * | 11/2009 | Fujimura et al. ............ | 382/103 |
| 7,961,910 B2 * | 6/2011 | Lee et al. ................... | 382/103 |
| 8,213,680 B2 * | 7/2012 | Fitzgibbon et al. .......... | 382/103 |
| 8,325,984 B2 * | 12/2012 | Lee et al. .................... | 382/103 |
| 8,368,875 B2 | 2/2013 | Kludas et al. | |
| 8,411,963 B2 * | 4/2013 | Luff ............................ | 382/194 |
| 2004/0247157 A1 * | 12/2004 | Lages et al. ................ | 382/103 |
| 2007/0286456 A1 | 12/2007 | Ariyur et al. | |
| 2008/0253606 A1 * | 10/2008 | Fujimaki et al. ............ | 382/100 |
| 2011/0150271 A1 * | 6/2011 | Lee et al. ................... | 382/103 |
| 2011/0299728 A1 * | 12/2011 | Markovic et al. ........... | 382/103 |
| 2012/0017231 A1 | 1/2012 | Chao | |
| 2012/0072936 A1 | 3/2012 | Small et al. | |
| 2012/0093481 A1 | 4/2012 | McDowell et al. | |
| 2012/0105585 A1 * | 5/2012 | Masalkar et al. ............ | 348/46 |
| 2012/0146902 A1 * | 6/2012 | Adermann et al. .......... | 345/158 |
| 2012/0163669 A1 * | 6/2012 | Mathe et al. ................ | 382/103 |

(Continued)

OTHER PUBLICATIONS

IP Australia, "Patent Examination Report No. 1," issued in connection with Application No. 2013204422, May 22, 2014, 5 pages.

(Continued)

*Primary Examiner* — Matthew Bella
*Assistant Examiner* — Soo Shin
(74) *Attorney, Agent, or Firm* — Hanley, Flight & Zimmerman, LLC

(57) ABSTRACT

Methods, apparatus, and articles of manufacture to monitor environments are disclosed. An example method includes analyzing a first depth value corresponding to a coordinate of an object of an image captured by a depth sensor, the first depth value having been captured with the depth sensor positioned at a first angle relative to a reference axis; moving the depth sensor to a second angle relative to the reference axis, the second angle being different than the first angle; triggering capture of a second depth value at the coordinate with the depth sensor positioned at the second angle; and calculating a depth gradient for the coordinate based on the first and second depth values.

22 Claims, 10 Drawing Sheets

(56) References Cited

U.S. PATENT DOCUMENTS

| | | |
|---|---|---|
| 2012/0294510 A1* | 11/2012 | Zhang et al. .................. 382/154 |
| 2012/0320080 A1 | 12/2012 | Giese et al. |
| 2012/0324491 A1 | 12/2012 | Bathiche et al. |
| 2012/0324492 A1 | 12/2012 | Treadwell, III et al. |
| 2012/0324493 A1 | 12/2012 | Holmdahl et al. |
| 2013/0093760 A1* | 4/2013 | Kwon et al. .................. 345/419 |
| 2014/0132499 A1* | 5/2014 | Schwesinger et al. ........ 345/156 |
| 2014/0161305 A1 | 6/2014 | Lee et al. |
| 2014/0282644 A1 | 9/2014 | Terrazas |

OTHER PUBLICATIONS

Shahram Izadi et al., "KinectFusion: Real-time 3D Reconstruction and Interaction Using a Moving Depth Camera", Oct. 16-19, 2011, pp. 1-10.

IP Australia, "Notice of Acceptance," issued in connection with Application No. 2013204422, May 18, 2015, 2 pages.

IP Australia, "Notice of Grant," issued in connection with Application No. 2013204422, Sep. 10, 2015, 1 page.

\* cited by examiner

METHODS, APPARATUS AND ARTICLES OF MANUFACTURE TO MONITOR ENVIRONMENTS

FIELD OF THE DISCLOSURE

This disclosure relates generally to monitoring systems and, more particularly, to methods, apparatus and articles of manufacture to monitor environments.

BACKGROUND

Audience measurement of media (e.g., broadcast television and/or radio, stored audio and/or video played back from a memory such as a digital video recorder or a digital video disc, a webpage, audio and/or video media presented (e.g., streamed) via the Internet, a video game, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

In some audience measurement systems, the people data is collected by capturing a series of images of a media exposure environment (e.g., a television room, a family room, a living room, a bar, a restaurant, etc.) and analyzing the images to determine, for example, an identity of one or more persons present in the media exposure environment, an amount of people present in the media exposure environment during one or more times and/or periods of time, etc. The collected people data can be correlated with media detected as being presented in the media exposure environment to provide exposure data (e.g., ratings data) for that media.

DETAILED DESCRIPTION

Figure 1:
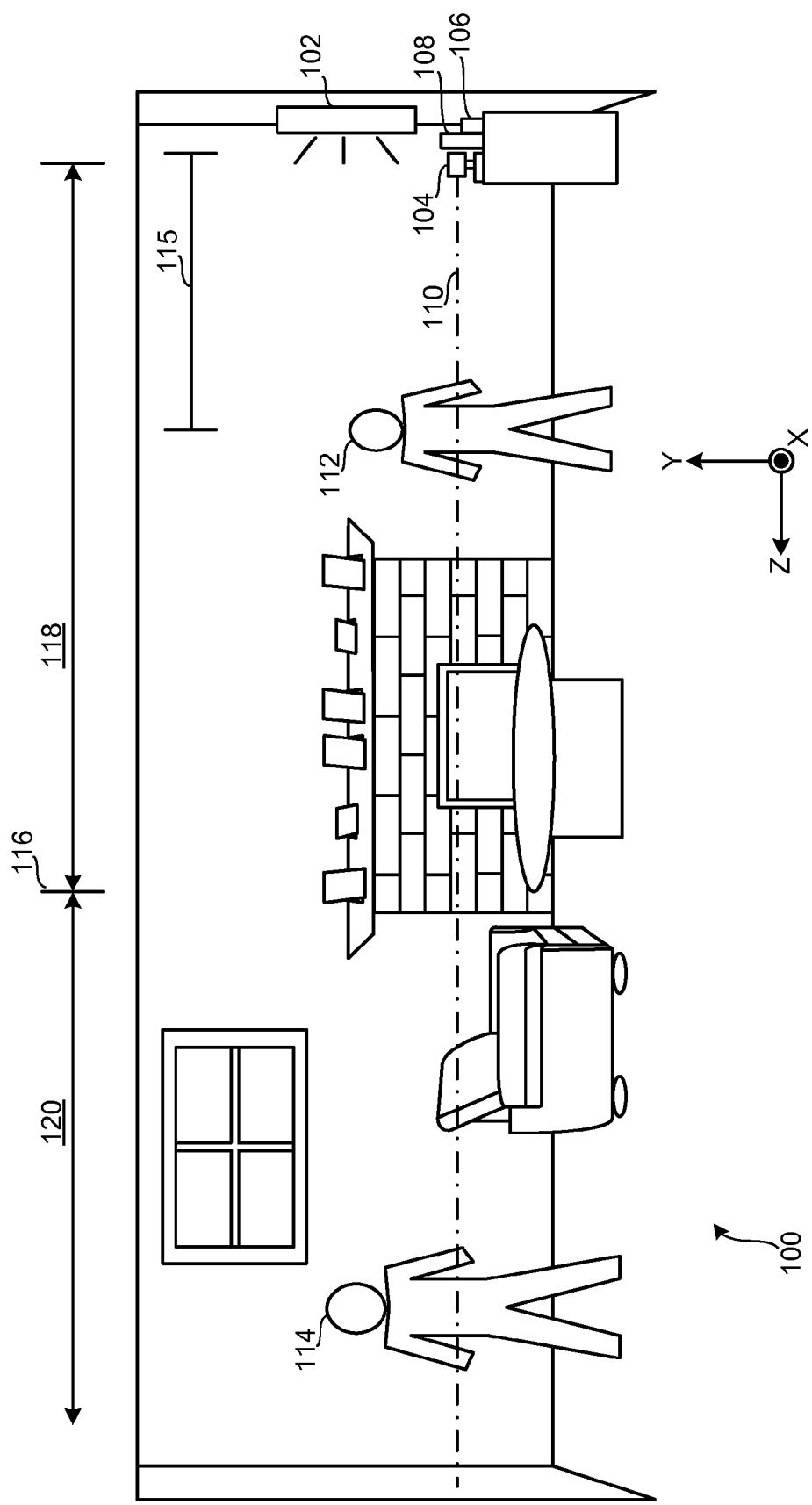
FIG. 1 is an illustration of an example media exposure environment including an example meter constructed in accordance with teachings of this disclosure.

In some audience measurement systems, people data is collected for a media exposure environment (e.g., a television room, a family room, a living room, a bar, a restaurant, an office space, a cafeteria, etc.) by capturing a series of images of the environment and analyzing the images to determine, for example, an identity of one or more persons present in the media exposure environment, an amount of people present in the media exposure environment during one or more times and/or periods of time, a gesture made by a person in the media exposure environment, etc. The people data can be correlated with, for example, media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist. For example, in each panelist site wherein the first piece of media is detected in the monitored environment at a first time, media identifying information for the first piece of media is correlated with presence information detected in the environment at the first time. The results from multiple panelist sites are combined and/or analyzed to provide ratings representative of exposure of a population as a whole.

Some audience measurement systems employ a recognition system to gather information from an environment. Recognition systems include device(s), application(s), and/or algorithm(s) tasked with identifying and/or detecting aspect(s) of data (e.g., image data and/or audio data) representative of an environment and/or occupants of the environment. Known recognition applications, systems, and devices include, for example, surveillance systems, consumer behavior monitors deployed in shopping centers, audience measurement devices, video games, etc. While described below in the context of recognizing people and/or aspects of people, example methods, apparatus, and/or articles of manufacture disclosed herein can be utilized in connection with additional or alternative recognition systems that detect, identify, and/or recognize additional or alternative types of objects. Further, while described below in the context of audience measurement, example methods, apparatus, and/or articles of manufacture disclosed herein can be utilized in connection with additional or alternative environments.

Recognition systems typically capture images of the monitored environment and analyze the images to, for example, count a number of people present in the monitored environment at certain times, identify people present in the environment, and/or identify a gesture made by a person. Some known recognition systems, such as those tasked with determining that a portion of image data represents a particular body part (e.g., an arm, a hand, a leg, a head, a torso, etc.) or those tasked with determining that a face belongs to a particular individual, require the image data to have at least a threshold resolution (e.g., for accurate results to be possible). Recent developments in the capture and processing of depth information for purposes of generating three-dimensional data have improved recognition systems that previously relied solely on two-dimensional image data. That is, systems tasked with, for example, recognizing objects as people, determining an identity of a person, and/or identifying a gesture being made by a person have benefited from three-dimensional imaging technology that has improved the accuracy, efficiency, and capabilities of such systems. For example, some three-dimensional data processing involves generating a skeletal framework representative of a detected person. The skeletal framework is especially useful in tracking movements of a person and/or identifying gestures made by the person. Further, capture and processing of three-dimensional data can provide a more accurate identification of an object as a body part (e.g., an arm, a hand, a head, a leg, etc.) than two-dimensional data. Further, capture and processing of three-dimensional data can provide a more accurate identification of a known person than two dimensional data. Further, capture and processing of three-dimensional data improves an ability to distinguish actual human faces from face-like patterns, such as painting, pictures, fabrics including face depictions, etc.

However, accuracy of recognition systems that utilize three-dimensional data depends on the depth value of the particular three-dimensional data. That is, recognition systems are less likely to accurately recognize a first object (e.g., as a person, as an intended gesture, as a face, as a particular face belonging to a particular person) located at a first distance from the corresponding depth sensor than a second object located at a second distance from the depth sensor. For example, depending on equipment and/or processing capabilities of the depth sensor being used to capture depth information for the three-dimensional data, the recognition system may have a depth range between 0.4 meters to 3.0 meters away from the depth sensor. In such instances, when the recognition system attempts to analyze portion(s) of an environment using depth data outside the depth range, the results often have an unacceptably high rate of false positives, false negatives, inaccurate identity recognitions, inaccurate gesture recognitions, etc.

These and other limitations and/or inaccuracies of known recognition systems can lead to, for example, an inaccurate tally of people for individual frames. An inaccurate tally of people in a frame can negatively affect the accuracy of media exposure data generated using the tally. For example, an audience measurement system counting the people in a room may also be collecting media identifying information to identify media being presented (e.g., aurally and/or visually) in the room. With the identification of the media and the amount of people in the room at a given date and time, the audience measurement system can indicate how many people were exposed to the specific media and/or associate the demographics of the people with the specific exposure. Such data from many such locations can be used to determine characteristics of the audience for the specific media. For instance, an audience measurement entity (e.g., The Nielsen Company (US), LLC) can calculate ratings for a piece of media detected in an environment by correlating presence information detected in the environment at times corresponding to a detection of the piece of media. If face(s) are not detected or recognized as faces, the exposure data for the identified media may be under counted (e.g., the media is credited with less viewers/listeners than had actually been exposed to the media). Alternatively, if false positives are detected, the exposure data for the identified media may be overstated (e.g., the media is credited with more viewers/listeners than had actually been exposed to the media). Similar negative effects may result from the recognition system detecting a first gesture designated for a first purpose (e.g., to provide positive feedback, to provide a first instruction to a media system such as a video game, etc.) as a second gesture designated for a second purpose (e.g., to provide negative feedback, to provide a second instructions to a media system such as a video game, etc.).

To compensate for the limited depth range of known recognitions systems, a recognition system may increase power of an infrared (IR) lamp used to project a dot pattern onto the environment. Additionally or alternatively, the resolution of an IR camera of the depth sensor may be increased. However, such adjustments are expensive and complex tasks. Further, the more powerful IR lamp and/or higher resolution IR camera may be unnecessary for a majority of recognition tasks and, thus, may represent overkill with respect to resources and cost feasibility.

Example methods, apparatus, and articles of manufacture disclosed herein provide granular depth information to improve accuracy for example recognition systems monitoring an environment. As described in detail below, examples disclosed herein capture multiple depth values for a particular coordinate of a monitored environment and calculate an accumulated value for the coordinate. Examples disclosed herein capture respective ones of the multiple depth values with a depth sensor positioned at different angles or tilts. Examples disclosed herein utilize a tilt motor associated with the depth sensor to rotate the depth sensor to the different angles. Examples disclosed herein take advantage of a likelihood that the object at the coordinate of interest has at least a minor difference in distance from the depth sensor when the depth sensor is tilted from position to position. In other words, the depth values captured when the depth sensor is positioned at the different angles likely vary for a three-dimensional object. Examples disclosed herein use the different depth values and the known angles of tilt to calculate an accumulated depth value for the coordinate of interest. The accumulated depth value calculated by examples disclosed herein is representative of a depth gradient at the coordinate of interest. The depth gradient provided by examples disclosed herein provides, for example, recognition system with additional information that is useful to, for example, confirm a person detection, an identity determination, and/or a gesture detection.

In some examples, generation of the depth gradient information is triggered by a recognition system detecting a person at a distance outside a usable depth range of the corresponding depth sensor. In other words, when a recognition system is analyzing a portion of the monitored environment outside of the optimal operating range of the depth sensor, examples disclosed herein provide additional information that effectively increases the resolution of the information at particular coordinates. Examples disclosed herein recognize that detecting a person has an unacceptably high error rate if the person is located more than certain distances away from the depth sensor. As such, when a recognition system detects a person at a distance from the depth sensor greater than a threshold distance based on a first set of image data (e.g., depth information and/or two-dimensional visual data), examples disclosed herein trigger capture of additional depth data with the depth sensor positioned at the different angles. Because the angles are known (e.g., predefined), examples disclosed herein are able to generate a depth gradient for the object of interest based on the detected depth values, thereby providing higher resolution data that enables more accurate recognition analyses.

In some examples disclosed herein, capture of the additional depth data with the depth sensor titled to the different angles may be reserved for certain circumstances and/or detections. For example, capture of the additional depth data provided by examples disclosed herein is triggered when a person is detected outside a depth range of the depth sensor specified for a person detection recognition analysis. Additionally or alternatively, capture of the additional depth data provided by examples disclosed herein is triggered when a gesture is detected outside a depth range of the depth sensor specified for a gesture detection recognition analysis. Additionally or alternatively, capture of the additional depth data provided by examples disclosed herein is triggered when movement is detected in the monitored environment outside a depth range of the depth sensor specified for a movement detection recognition analysis. Additionally or alternatively, capture of the additional depth data provided by examples disclosed herein is triggered when determination of an identity of a person located outside a depth range of the depth sensor is desired.

FIG. 1 is an illustration of an example media exposure environment 100 including an information presentation device 102, an example image capturing device 104, and a meter 106 for collecting audience measurement data. In the illustrated example of FIG. 1, the information presentation device 102 is a television and the media exposure environment 100 is a room of a household (e.g., a room in a home of a panelist such as the home of a "Nielsen family") that has been statistically selected to develop television ratings data for population(s)/demographic(s) of interest. In the illustrated example, one or more persons of the household have registered with an audience measurement entity (e.g., by agreeing to be a panelist) and have provided demographic information to the audience measurement entity as part of a registration process to enable associating demographics with viewing activities (e.g., media exposure). The example audience measurement system of FIG. 1 can be implemented in additional and/or alternative types of environments such as, for example, a room in a non-statistically selected household, a theater, a restaurant, a tavern, a retail location, an arena, etc. For example, the environment may not be associated with a panelist of an audience measurement study, but instead may simply be an environment associated with a purchased XBOX® and/or Kinect® system. In some examples, the example audience measurement system of FIG. 1 is implemented, at least in part, in connection with additional and/or alternative types of media presentation devices such as, for example, a radio, a computer, a tablet (e.g., an iPad®), a cellular telephone, and/or any other communication device able to present media to one or more individuals.

In the example of FIG. 1, the meter 106 is a software meter provided for collecting and/or analyzing the data from the image capturing device 104 and other media identification data collected as explained below. In some examples, the meter 106 is installed in the video game system 108 (e.g., by being downloaded to the same from a network, by being installed at the time of manufacture, by being installed via a port (e.g., a universal serial bus (USB) from a jump drive provided by the audience measurement company, by being installed from a storage disc (e.g., an optical disc such as a BluRay disc, Digital Versatile Disc (DVD) or CD (compact Disk), or by some other installation approach). Executing the meter 106 on the panelist's equipment is advantageous in that it reduces the costs of installation by relieving the audience measurement entity of the need to supply hardware to the monitored household. In other examples, rather than installing the software meter 106 on the panelist's consumer electronics, the meter 106 is a dedicated audience measurement unit provided by the audience measurement entity. In such examples, the meter 106 may include its own housing, processor, memory and software to perform the desired audience measurement functions. In such examples, the meter 106 is adapted to communicate with the image capturing device 104 via a wired or wireless connection. In some such examples, the communications are effected via the panelist's consumer electronics (e.g., via a video game console). In other examples, the image capturing device 104 is dedicated to audience measurement and, thus, no direct interaction (outside of monitoring outputs) with the consumer electronics owned by the panelist is involved.

As described in detail below, the example meter 106 of FIG. 1 utilizes the image capturing device 104 to capture a plurality of time stamped frames of visual image data (e.g., via a two-dimensional camera) and/or depth data (e.g., via a depth sensor) from the environment 100. In the example of FIG. 1, the image capturing device 104 of FIG. 1 is part of the video game system 108 (e.g., Microsoft® XBOX®, Microsoft® Kinect®). However, the example image capturing device 104 can be associated and/or integrated with a set-top box (STB) located in the environment 100, associated and/or integrated with the information presentation device 102, associated and/or integrated with a BluRay® player located in the environment 100, or can be a standalone device (e.g., a Kinect® sensor bar, a dedicated audience measurement meter, etc.), and/or otherwise implemented. In some examples, the meter 106 is integrated in an STB or is a separate standalone device and the image capturing device 104 is the Kinect® sensor or another sensing device.

In some examples, the audience measurement entity provides the image capturing device 104 to the household. In some examples, the image capturing device 104 is a component of a media presentation system purchased by the household such as, for example, a camera of a video game system 108 (e.g., Microsoft® Kinect®) and/or piece(s) of equipment associated with a video game system (e.g., a Kinect® sensor). In such examples, the image capturing device 104 may be repurposed and/or data collected by the image capturing device 104 may be repurposed for audience measurement. In some examples, the image capturing device 104 is integrated with the video game system 108. For example, the image capturing device 104 may collect image data (e.g., three-dimensional data and/or two-dimensional data) using one or more sensors for use with the video game system 108 and/or may also collect such image data for use by the meter 106. In some examples, the image capturing device 104 employs a first type of image sensor (e.g., a camera) to obtain image data of a first type (e.g., two-dimensional data) and a second type of image sensor (e.g., a depth sensor) to collect a second type of image data (e.g., three-dimensional data). In some examples, only one type of sensor is provided by the video game system 108 and a second sensor is added by an audience measurement system including the meter 106.

To capture depth data, the example image capturing device 104 of FIG. 1 uses a laser or a laser array to project a dot pattern onto the environment 100. Depth data collected by the image capturing device 104 can be interpreted and/or processed based on the dot pattern and how the dot pattern lays onto objects of the environment 100. In the illustrated example of FIG. 1, the image capturing device 104 also captures two-dimensional image data via one or more cameras (e.g., infrared sensors) capturing images of the environment 100. In some examples, the image capturing device 104 also includes audio capturing component(s) such as, for example, a directional microphone. In some examples, the example image capturing device 104 of FIG. 1 is capable of detecting some or all of eye position(s) and/or movement(s), skeletal profile(s), pose(s), posture(s), body position(s), person identit(ies), body type(s), etc. of the individual audience members. In some examples, the data detected via the image capturing device 104 is used to, for example, detect and/or react to a gesture, action, or movement taken by the corresponding audience member.

In the illustrated example of FIG. 1, the image capturing device 104 is placed adjacent the information presentation device 102 at a position for capturing image data of the environment 100. While the image capturing device 104 is positioned beneath the information presentation device 102 in the example of FIG. 1, the image capturing device 104 can be located at alternative locations (e.g., above the information presentation device 102, mounted to a wall at a side of the information presentation device 102, etc.). The example image capturing device 104 of FIG. 1 is a stationary apparatus in that the image capturing device 104 is positioned at a set location (e.g., on top of a media center) and meant to remain in that location when capturing images. That is, the example image capturing device 104 of FIG. 1 is not meant for mobile usage by, for example, picking up the image capturing device 104 and capturing data while moving the image capturing device 104 around.

The example image capturing device 104 of FIG. 1 has a baseline angular position 110 corresponding to an axis that extends into the environment 100 (e.g., along a substantially horizontal axis). The baseline angular position 110 is also referred to herein as a reference angular position or reference axis. In some examples, the baseline angular position 110 of the image capturing device 104 is set as part of a calibration process upon initialization of the image capturing device 104. The example image capturing device 104 of FIG. 1 includes a tilt mechanism, such as a tilt motor, to change the angular position of the image capturing device 104 by a certain degree from the baseline angular position 110. A change in the angular position of the image capturing device 104 alters the perspective of the image capturing device 104.

Figure 2:
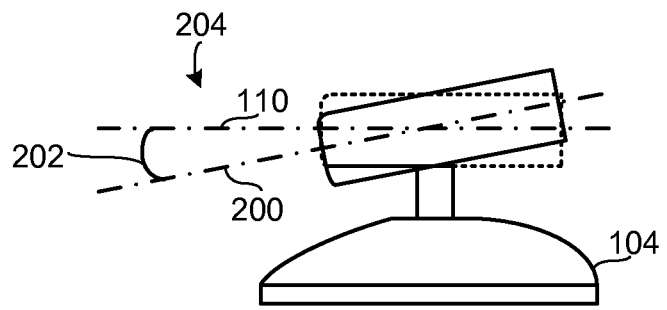
FIG. 2 is an illustration of the example image capturing device of FIG. 1 in a first tilted position.

FIG. 2 illustrates the example image capturing device 104 at a first titled position 200 implemented via the tilt mechanism. The first tilted position 200 of FIG. 2 varies from the baseline angular position 110 by a first degree 202 in a first (downward) direction 204. For purposes of clarity and brevity, the first degree 202 and the first direction 204 are referred to herein as the negative degree 202 and the negative direction 204.

Figure 3:
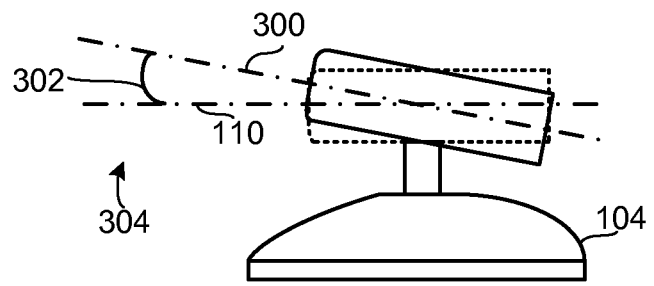
FIG. 3 is an illustration of the example image capturing device of FIG. 1 in a second titled position.

FIG. 3 illustrates the example image capturing device 104 at a second titled position 300 implemented via the tilt mechanism. The second tilted position 300 of FIG. 3 varies from the baseline angular position 110 by a second degree 302 in a second direction (upward) 304 opposite of the first direction 204 of FIG. 2. For purposes of clarity and brevity, the second degree 302 and the second direction 304 of FIG. 3 are referred to herein as the positive degree 302 and the positive direction 304. The negative degree 202 shown in FIG. 2 and the positive degree 302 shown in FIG. 3 may be the same or different degrees. The tilt mechanism of the image capturing device 104 can place the image capturing device 104 (e.g., a housing of the image capturing device 104) in any suitable angular position (e.g., two degrees in the negative direction 204, five degrees in the negative direction 204, two degrees in the positive direction 304, five degrees in the positive direction 304, etc.). As described in detail below, the example meter 106 of FIG. 1 utilizes the tilt mechanism of the image capturing device 104 to capture additional depth information for one or more coordinates of interest in the environment 100 and to calculate an accumulated depth value for the coordinate(s) of interest to provide more granular depth information. The more granular depth information provided by the example meter 106 enables, for example, more accurate recognition analyses for the environment 100.

In the example shown in FIG. 1, first and second persons 112 and 114 are present in the environment 100. In the illustrated example, the first person 112 is located at a first distance 115 from the image capturing device 104 less than a threshold distance 116 that separates a first set of distances 118 and a second set of distances 120. The example threshold distance 116 of FIG. 1 is defined based on, for example, one or more aspects (e.g., resolution capabilities) of the image capturing device 104 and/or one or more aspects (e.g., resolution capabilities) of recognition analyses that utilize information generated by the image capturing device 104. Additional or alternative threshold distances may be defined for the environment 100 based on, for example, a type of recognition analysis (e.g., person detection, identity calculation, gesture identification, etc.) being performed. That is, in some examples the example threshold distance 116 of FIG. 1 corresponds to a person detection recognition analysis, while a second, different, threshold distance is defined for a gesture identification recognition analysis. The threshold distance(s) 116 and the sets of distances 118 and 120 are described in greater detail below.

Figure 4:
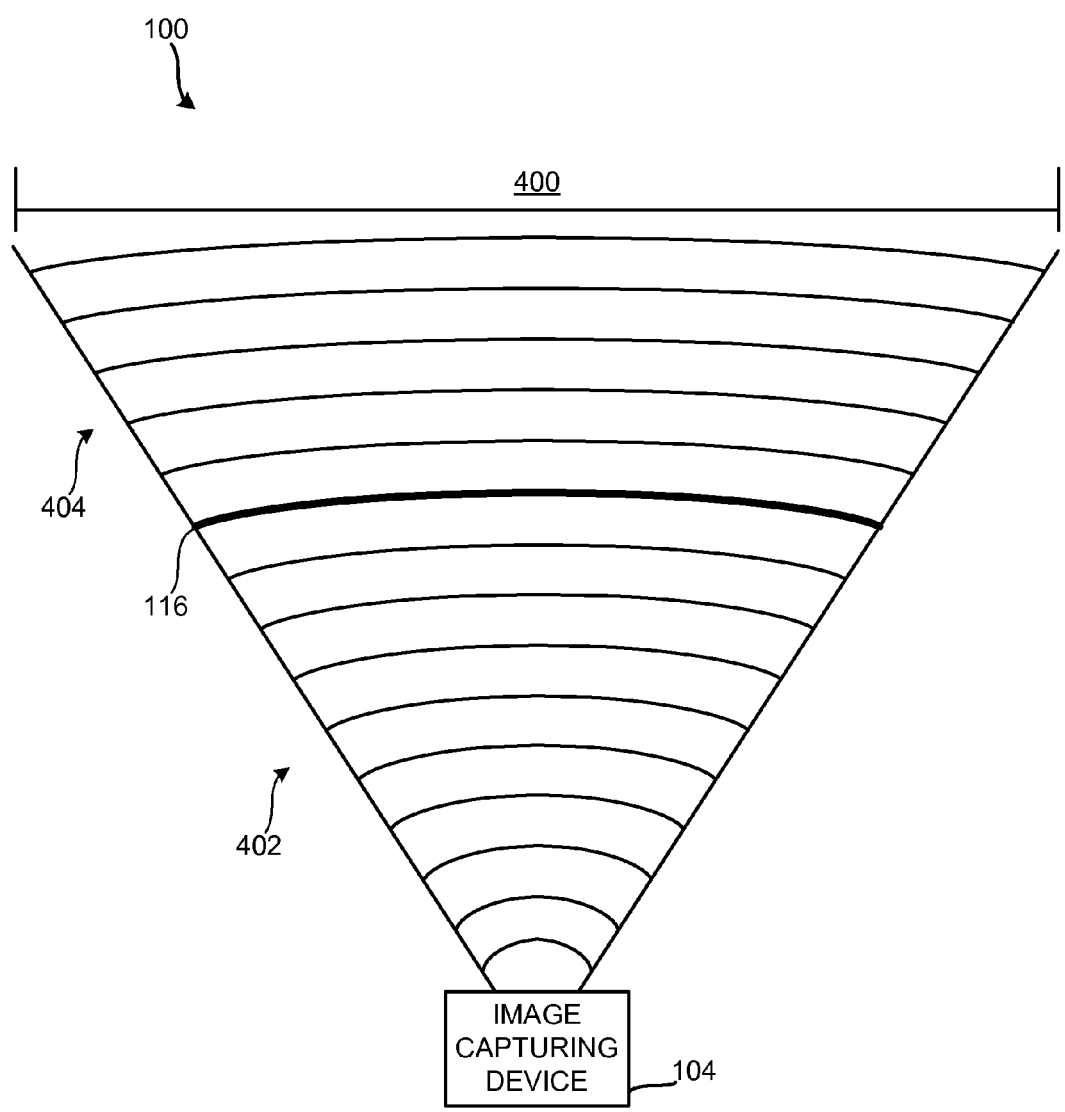
FIG. 4 is another illustration of the example media exposure environment of FIG. 1 from a different perspective than FIG. 1.

FIG. 4 illustrates the example media exposure environment 100 of FIG. 1 from a different perspective (e.g., a bird's eye view). In particular, the example image capturing device 104 captures data across a field of view 400 illustrated in FIG. 4. As shown in the example of FIG. 4, a first detection area 402 corresponding to the first set of distances 118 of FIG. 1 falls within a conical envelope defined below the example distance threshold 116 and within the field of view 400. A second detection area 404 corresponding to the second set of distances 120 of FIG. 1 falls within a truncated conical envelope beyond the example distance threshold 116 and within the field of view 400. As described in detail below, the example meter 106 of FIG. 1 triggers the image capturing device 104 to gather additional information for certain recognition tasks when, for example, an object of interest is detected in the second detection area 404, beyond the distance threshold 116. The example environment 100 may include additional or alternative distance thresholds that define different detection areas when, for example, additional or alternative recognition task(s) are being performed.

Figure 5:
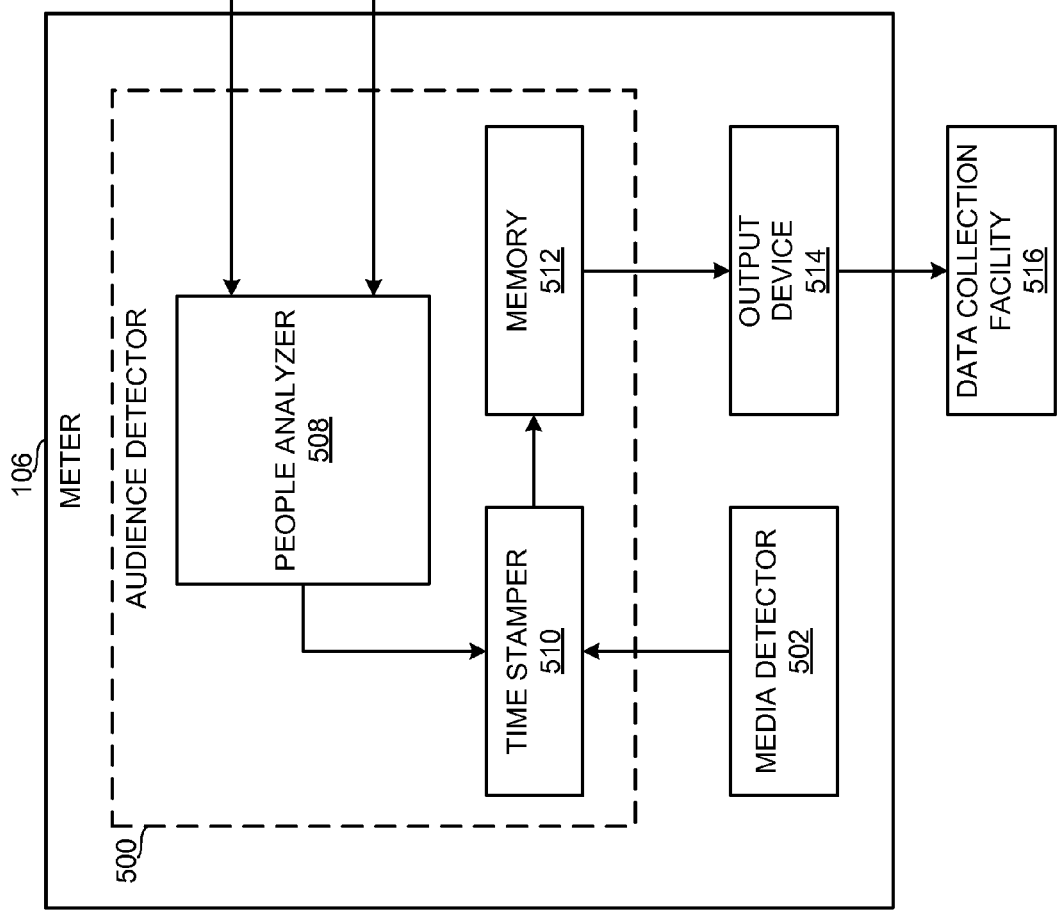
FIG. 5A is a block diagram of an example implementation of the example meter of FIG. 1.
FIG. 5B is a block diagram of an example implementation of the example image capturing device of FIGS. 1, 2, 3 and/or 4.

FIG. 5A illustrates an example implementation of the meter 106 of FIG. 1. FIG. 5B illustrates an example implementation of the image capturing device 104 of FIG. 1. The example meter 106 of FIG. 5A includes an audience detector 500 to develop audience composition information regarding, for example, presence of people in the example environment 100 of FIG. 1. The example meter 106 of FIG. 5 also includes a media detector 502 to collect information regarding, for example, media presented in the environment 100 of FIG. 1. The example media detector 502 is discussed further below. The example image capturing device 104 of FIG. 5B includes a depth sensor 504 capable of capturing distances of objects from the image capturing device 104 at different coordinates within the environment 100. The example depth sensor 504 is also referred to herein as a three-dimensional sensor. The example image capturing device 104 of FIG. 5B also includes a two-dimensional sensor 506 capable of capturing visual data representative of the environment 100. While the example image capturing device 104 of FIG. 5B includes the depth sensor 504 and the two-dimensional sensor 506, the example meter 106 may additionally or alternatively receive three-dimensional data and/or two-dimensional data representative of the environment 100 from a different source. For example, the image capturing device 104 may include the two-dimensional sensor 506 and may receive three-dimensional data representative of the environment 100 from a three-dimensional sensor implemented by a different component in communication with the example meter 106 such as, for example, a video game system (e.g., Microsoft® Kinect®) owned by the panelist. In some examples, the image capturing device 104 is implemented by a Kinect® sensor which includes both the two-dimensional sensor 506 and the depth sensor 504.

The example depth sensor 504 of FIG. 5B projects an array or grid of dots (e.g., via one or more electromagnetic radiation beams) onto objects of the environment 100. The dots of the array projected by the example depth sensor 504 have respective x-axis coordinates and y-axis coordinates and/or some derivation thereof. The example depth sensor 504 of FIG. 5B uses feedback received in connection with the dot array to calculate depth values associated with different dots projected onto the environment 100. Thus, the example depth sensor 504 generates a plurality of data points. Each such data point has a first component representative of an x-axis position in the environment 100, a second component representative of a y-axis position in the environment 100, and a third component representative of a z-axis position in the environment 100. As used herein, the x-axis position of an object is referred to as a horizontal position, the y-axis position of the object is referred to as a vertical position, and the z-axis position of the object is referred to as a depth position relative to the image capturing device 104. In the illustrated example, the array projected onto the environment 100 is an infrared array. The example image capturing device 104 of FIG. 5B may utilize additional or alternative type(s) of three-dimensional sensor(s) to capture three-dimensional data representative of the environment 100 such as, for example, image capturing devices employing structured lighting, time-of-flight of light, and/or stereo cameras.

The example two-dimensional sensor 506 of FIG. 5B is implemented by a sensor and/or camera that captures two-dimensional image data representative of the environment 100. In some examples, the two-dimensional sensor 506 includes an infrared imager, a complimentary metal-oxide semiconductor (CMOS) camera, and/or a charge coupled device (CCD) camera.

In some examples, the depth sensor 504 and/or the two-dimensional sensor 506 only capture data when the information presentation device 102 is in an "on" state and/or when the media detector 502 determines that media is being presented in the environment 100 of FIG. 1.

The example audience detector 500 of FIG. 5A includes a people analyzer 508, a time stamper 510 and a memory 512. In the illustrated example of FIG. 5A, the data generated by the example depth sensor 504 and/or the example two-dimensional sensor 506 is conveyed to the example people analyzer 508. The example people analyzer 508 of FIG. 5A calculates a people count corresponding to a configurable time period (e.g., one minute intervals, thirty second intervals, etc.) for the example environment 100 of FIG. 1. Additionally, the example people analyzer 508 of FIG. 5A determines identities of detected people using, for example, any suitable facial recognition technique and/or application. Additionally, the example people analyzer 508 of FIG. 5A detects and/or identifies gestures made by people in the environment 100. Gestures made by people in the environment 100 correspond to, for example, a feedback input to provide an opinion on media being presented on the information presentation device 102. Alternatively, gestures made by people in the environment 100 may correspond to an instruction for the information presentation device 102 and/or the video game system 108. In some examples, the people analyzer 508 communicates with the video game system 108 to utilize the gesture detection capabilities of the video game system 108.

The example people analyzer 508 of FIG. 5A outputs, for example, calculated people counts or tallies to the example time stamper 510. The time stamper 510 of the illustrated example includes a clock and a calendar. The example time stamper 510 associates a time period (e.g., 1:00 a.m. Central Standard Time (CST) to 1:01 a.m. CST) and date (e.g., Jan. 1, 2013) with each calculated people count by, for example, appending the period of time and date information to an end of the people data. In some examples, the time stamper 510 applies a single time and date rather than a period of time. A data package (e.g., the people count, the time stamp, the image data, etc.) is stored in the memory 512.

The example memory 512 of FIG. 5A may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 512 of FIG. 5A may also include one or more mass storage devices such as, for example, hard drive disk(s), compact disk drive(s), digital versatile disk drive(s), etc. When the example meter 106 is integrated into, for example, the video game system 108 of FIG. 1, the meter 106 may utilize memory of the video game system 108 to store information such as, for example, the people counts, the image data, etc.

The example time stamper 510 of FIG. 5A also receives data from the example media detector 502. The example media detector 502 of FIG. 5A detects presentation(s) of media in the media exposure environment 100 and/or collects identification information associated with the detected presentation(s). For example, the media detector 502, which may be in wired and/or wireless communication with the information presentation device 102 (e.g., a television), the video game system 108, an STB associated with the information presentation device 102, and/or any other component of FIG. 1, can identify a presentation time and/or a source of a presentation. The presentation time and the source identification data may be utilized to identify the program by, for example, cross-referencing a program guide configured, for example, as a look up table. In such instances, the source identification data is, for example, the identity of a channel (e.g., obtained by monitoring a tuner of an STB or a digital selection made via a remote control signal) currently being presented on the information presentation device 102.

Additionally or alternatively, the example media detector 502 of FIG. 5A can identify the presentation by detecting codes and/or watermarks embedded with or otherwise conveyed (e.g., broadcast) with media being presented via an STB and/or the information presentation device 102. As used herein, a code is an identifier that is transmitted with the media for the purpose of identifying (e.g., an audience measurement code) and/or for tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example, the media detector 502 extracts the code(s) from the media. In other examples, the media detector may collect samples of the media and export the samples to a remote site for detection of the code(s).

Additionally or alternatively, the example media detector 502 of FIG. 5A can collect a signature representative of a portion of the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media. In some examples, the signature(s) are generated by the media detector 502. Additionally or alternatively, the example media detector 502 collects samples of the media and exports the samples to a remote site for generation of the signature(s). In the example of FIG. 5A, irrespective of the manner in which the media of the presentation is identified (e.g., based on tuning data, metadata, codes, watermarks, and/or signatures), the media identification information is time stamped by the time stamper 510 and stored in the memory 512.

In the illustrated example of FIG. 5A, an output device 514 periodically and/or aperiodically exports the audience identification information and/or the media identification information from the memory 512 to a data collection facility 516 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 106 utilizes the communication capabilities (e.g., network connections) of the video game system 108 to convey information to, for example, the data collection facility 516. In the illustrated example of FIG. 5A, the data collection facility 516 is managed and/or owned by an audience measurement entity (e.g., The Nielsen Company (US), LLC). The audience measurement entity associated with the example data collection facility 516 of FIG. 5A utilizes the people tallies generated by the people analyzer 508 in conjunction with the media identifying data collected by the media detector 502 to generate exposure information. The information from many panelist locations may be collected and analyzed to generate ratings representative of media exposure by one or more populations of interest.

While an example manner of implementing the meter 106 of FIG. 1 is illustrated in FIG. 5A, one or more of the elements, processes and/or devices illustrated in FIG. 5A may be combined, divided, re-arranged, omitted, eliminated and/or implemented in any other way. Further, the example audience detector 500, the example media detector 502, the example people analyzer 508, the example time stamper 510 and/or, more generally, the example meter 106 of FIG. 5A may be implemented by hardware, software, firmware and/or any combination of hardware, software and/or firmware. Thus, for example, any of the example audience detector 500, the example media detector 502, the example people analyzer 508, the example time stamper 510 and/or, more generally, the example meter 106 of FIG. 5A could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example audience detector 500, the example media detector 502, the example people analyzer 508, the example time stamper 510 and/or, more generally, the example meter 106 of FIG. 5A are hereby expressly defined to include a tangible computer readable storage device or storage disc such as a memory, DVD, CD, Blu-ray, etc. storing the software and/or firmware. Further still, the example meter 106 of FIG. 5A may include one or more elements, processes and/or devices in addition to, or instead of, those illustrated in FIG. 5A, and/or may include more than one of any or all of the illustrated elements, processes and devices.

Figure 6:
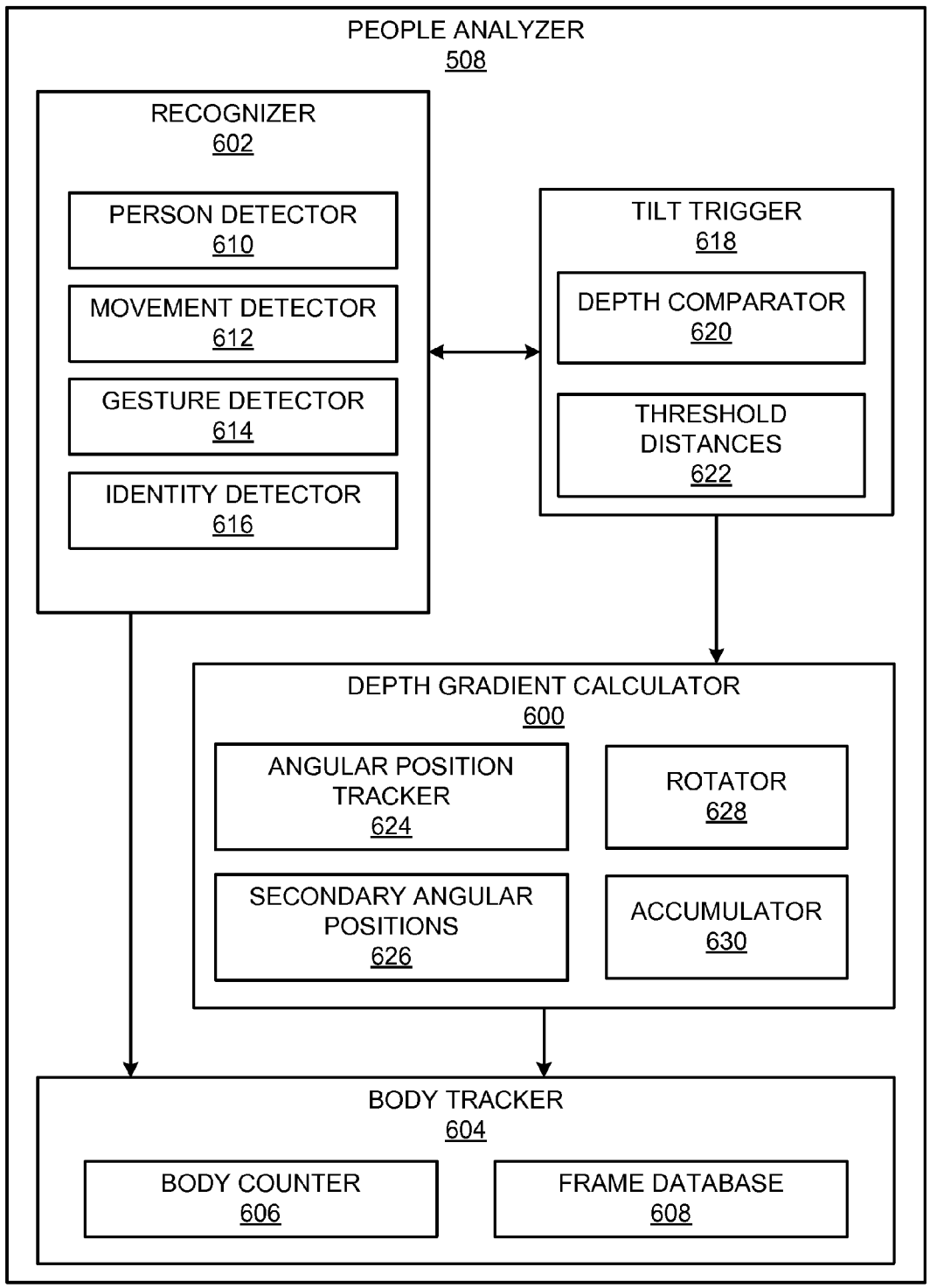
FIG. 6 is a block diagram of an example implementation of the example people analyzer of FIG. 5A.

FIG. 6 illustrates an example implementation of the example people analyzer 508 of FIG. 5A. For clarity of illustration, internal connectors within some of the structure and/or circuitry of FIG. 6 are omitted. However, it will be understood that appropriate connectors, busses, and/or other means of communication are provided throughout FIG. 6 to enable transfer of data and/or cooperation between components. In some examples, communication is achieved by writing data to a mutually accessible memory. The example people analyzer 508 of FIG. 6 generates a people count or tally representative of a number of people in the media exposure environment 100 of FIG. 1 for frame(s) of captured image data. The rate at which the example people analyzer 508 of FIG. 6 generates people counts is configurable. In the illustrated example of FIG. 6, the example people analyzer 508 instructs the example image capturing device 104 to capture image data representative of the environment 100 every five seconds. However, the example people analyzer 508 can capture and/or analyze data at any suitable rate. As described in detail below, the example people analyzer 508 of FIG. 6 utilizes a depth gradient calculator 600 to calculate a depth gradient for coordinate(s) in the environment when, for example, a recognizer 602 of the people analyzer 508 (and/or any other suitable component(s)) determines that such a calculation is appropriate and/or desired. The example depth gradient calculator 600 is described further below. The example people analyzer 508 of FIG. 6 also includes a body tracker 604 to store information generated by the recognizer 602 and information related thereto. The example body tracker 604 of FIG. 6 includes a body counter 606 to maintain a tally of people currently in the environment 100 and a frame database 608 to store the tally and/or information associated with the tally.

The example recognizer 602 of FIG. 6 receives image data from the image capturing device 104. In the illustrated example, the received image data includes a depth value provided by the depth sensor 504 of FIG. 5B for each X-Y coordinate of the environment 100. The depth values received from the image capturing device 104 in the course of scheduled data capture (e.g., according to a schedule and/or a timer) are referred to herein as primary depth values. The received image data additionally or alternatively includes visual two-dimensional data provided by the two-dimensional sensor 506 of FIG. 5B. The example recognizer 602 of FIG. 6 implements a plurality of detectors to analyze the received image data. In particular, the example recognizer 602 of FIG. 6 includes a person detector 610, a movement detector 612, a gesture detector 614, and an identity detector 616. The example person detector 610 of FIG. 6 determines whether a set of image data points (e.g., a plurality of data points corresponding to a plurality of neighboring coordinates in the environment 100) corresponds to a human body and/or a part of a human body (e.g., a head, an arm, a hand, a foot, a torso, etc.). The determination of whether the image data corresponds to a person is based on, for example, one or more comparisons of the data to shapes, contrasts, and/or any other suitable image characteristic(s) known to correspond to a person. When the example person detector 610 of FIG. 6 detects a person, the person detector 610 records one or more X-Y coordinates of the environment 100 associated with the detection. In some examples, the person detector 610 records each of the coordinates believed to correspond to the person. In some examples, the person detector 610 records a marking coordinate associated with, for example, a center of the detected person (e.g., the center of a detected head or torso).

Figure 7:
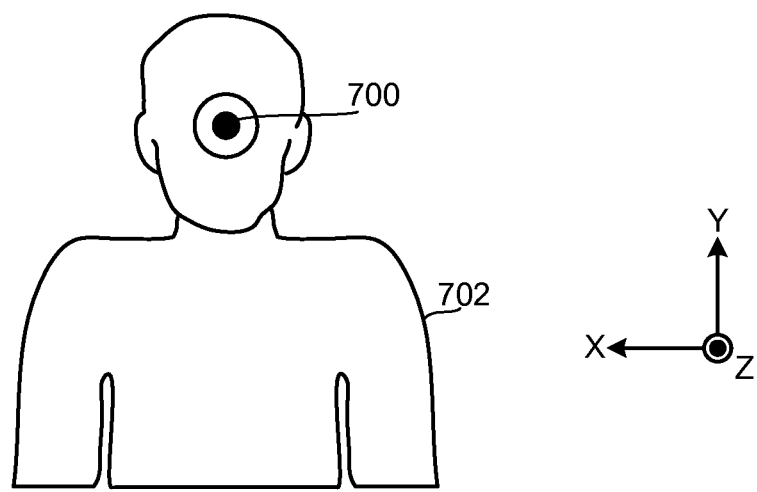
FIG. 7 is an illustration of an example coordinate corresponding to a person detection generated by the example recognizer of FIG. 6.

FIG. 7 illustrates an example marking coordinate 700 to track an X-Y position of a detected person 702 in the environment 100.

In the illustrated example, an indication of the person detection and the recorded coordinate(s) associated therewith are conveyed to the body tracker 604. The example body counter 606 increments a person tally or count in response to receiving the indication of the person detection. Additionally, the corresponding frame of image data, the person detection, and the recorded coordinate(s) are stored in the example frame database 608 for purposes of, for example, record keeping, subsequent verification procedures, and/or comparison to other frames (e.g., a subsequent frame to determine if movement has occurred in the environment 100).

The example movement detector 612 of FIG. 6 maintains a chronological record of recently captured frames (e.g., the last five frames captured by the image capturing device 104) and uses the same to detect movement in the environment 100. For example, the movement detector 612 compares a first frame of image data with a previous (second) frame of image data to detect any changes (e.g., beyond a threshold amount of change) in, for example, brightness, depth, contrast, etc. Additionally or alternatively, the example movement detector 612 may access the frame database 608 to obtain frames of image data for the comparison. The example movement detector 612 may detect movement in the environment 100 using additional or alternative techniques and/or devices (e.g., motion sensors).

When the example person detector 610 of FIG. 6 determines that a person is present in the environment 100, the type of detected body part and the location thereof (e.g., according to the recorded coordinate(s), such as the marking coordinate 700 of FIG. 7) is conveyed to the gesture detector 614, which generates a skeletal frame representative of the detected person. In particular, the example gesture detector 614 analyzes the three-dimensional data points provided by the depth sensor 504 of FIG. 5B to generate a representation of a current shape of the detected body. For example, the gesture detector 614 of FIG. 6 generates a plurality of centerline points corresponding to detected body parts and the relation of the detected body parts to other body parts of the detected person. The example gesture detector 614 compares one or more portions of the skeletal frame to known shapes and/or outlines corresponding to one or more gestures. When the gesture detector 614 determines that the detected person is making a certain gesture, an indication of the gesture detection, the detected gestures, and a location of the gesture is conveyed to the body tracker 604 and the appropriate information is stored in the frame database 608.

When the example person detector 610 of FIG. 6 detects a person in the environment 100, the identity detector 616 performs an identity recognition analysis at the recorded coordinate(s) corresponding to the detected person (e.g., according to the marking coordinate 700 of FIG. 7). In the illustrated example, the identity detector 616 attempts to identify the detected body as belonging to one of a plurality of known people, such as a family of the household, frequent visitors of the household, etc. The example identity detector 616 of FIG. 6 employs any suitable facial recognition technique and/or procedure based on, for example, the three-dimensional image data provided by the depth sensor 504 of FIG. 5B, the two-dimensional image data provided by the two-dimensional sensor 506 of FIG. 5B, and/or a combination of the three-dimensional image data and the two-dimensional image data. When the example identity detector 616 identifies the detected body as corresponding to a known person, the example identity detector 616 conveys the detected identity of the person (e.g., an identifier designated for the known person during a panelist registration process) to the example body tracker 604. In the illustrated example of FIG. 6, the identity of the detected body is stored in the frame database 618 in association with the appropriate frame of data.

While the people analyzer 508 of FIG. 6 includes the person detector 610, the movement detector 612, the gesture detector 614, and the identity detector 616, examples disclosed herein may be implemented in connection with additional or alternative types of recognition components that process additional or alternative data for additional or alternative purposes.

The example people analyzer 508 of FIG. 6 includes a tilt trigger 618 to trigger the depth gradient calculator 600 depending on, for example, one or more aspects of the detections made by the example recognizer 602. In particular, the example tilt trigger 618 determines whether one or more conditions are present in connection with any of the detection(s) made by the recognizer 602 and/or any other aspect(s) of the procedures of the example people analyzer 508 of FIGS. 5A and/or 6. The example tilt trigger 618 of FIG. 6 triggers a depth gradient calculation as disclosed herein in response to certain different circumstances and/or in response to different events associated with the analyses of the environment 100.

For example, the trigger 618 of FIG. 6 includes a depth comparator 620 to trigger the depth gradient calculator 600 in response to certain detections of the recognizer 602 occurring at certain distances away from the image capturing device 104. In particular, the depth comparator 620 of the illustrated example compares the depth value of a particular detection made by one of the detectors 610-616 to a threshold distance, such as the example threshold 116 of FIGS. 1 and 4. The example tilt trigger 618 includes a plurality of threshold distances 622 for use by the depth comparator 620. In the illustrated example, which one of the threshold distances 622 is to be used by the depth comparator 620 in a particular circumstance depends on which detector 610-616 of the recognizer 602 generated the detection of interest. The example depth comparator 620 of the illustrated example uses (1) a person detection threshold distance when analyzing a detection made by the person detector 610, (2) a movement detection threshold distance when analyzing a detection made by the movement detector 612, (3) a gesture detection threshold distance when analyzing a detection made by the gesture detector 614, and (4) an identity detection threshold distance when analyzing a detection made by the identity detector 616. Additionally or alternatively, the example depth comparator 620 can use a universal threshold distance, such as the example threshold 116 of FIGS. 1 and 4 for every type of detection and/or a subset of the types of detections made by the example recognizer 602. In the illustrated example, the threshold distances 622 are defined (e.g., by a designer or programmer of the example meter 106 and/or the image capturing device 104) based on one or more capabilities (e.g., IR lamp power, resolution, etc.) of the image capturing device 104. In particular, the threshold distances 622 are selected based on, for example, a usable depth range of the depth sensor 504 of FIG. 5B for a corresponding task. The usable depth range of the depth sensor 504 corresponds to distances away from the depth sensor 504 at which accurate recognition results can be generated for the task at hand (e.g., person identification may have different accuracy results at different distances than gesture recognition). For example, the person detection threshold distance used by the depth comparator 620 of the illustrated example for detections made by the person detector 610 corresponds to a distance away from the depth sensor 504 at which the accuracy of the person detector 610 falls below a certain percentage (e.g., a percentage representative of a likelihood that a detection is a true positive).

The example depth comparator 620 of the illustrated example determines whether the appropriate one of the threshold distances 622 (depending on which of the detectors 610-616 generated the detection) is exceeded by a depth value corresponding to the instant detection. As described above, the detectors 610-616 record a coordinate of the respective detections indicative of a location in the environment 100 at which the detection was made, such as the coordinate 700 of FIG. 7. As described above, the coordinate 700 has a primary depth value assigned thereto. A primary depth value is generated by the depth sensor 504 of the illustrated example for each captured frame. The example depth comparator 620 of FIG. 6 compares the primary depth value of the coordinate to the appropriate one of the threshold distances 622. If the primary depth value of the coordinate exceeds the selected one of the threshold distances 622, the example depth comparator 620 of the illustrated example triggers the example depth gradient calculator 600. Thus, when a detection is made by the recognizer 602 at a distance away from the image capturing device 104 at which an error rate of the recognizer 602 is unacceptably high, the tilt trigger 618 engages the depth gradient calculator 600 to gather additional data and to generate the depth gradient from which more accurate recognition results are possible.

When triggered, the example depth gradient calculator 600 of FIG. 6 receives or otherwise obtains one or more coordinates of the detection that triggered the depth gradient calculator 600. For example, when the tilt trigger 618 triggers the depth gradient calculator 600 in response to a detection (e.g., a person detection generated by the example person detector 610) at a location of the environment 100 corresponding to the marking coordinate 700 of FIG. 7, the example depth gradient calculator 600 receives the marking coordinate 700 of FIG. 7. The example depth gradient calculator 600 of FIG. 6 also receives the primary depth value of the triggering detection. The primary depth value received by the example depth gradient calculator 600 is the depth value generated by the example depth sensor 504 of FIG. 5B for the marking coordinate 700 of FIG. 7. The primary depth value represents a distance between the depth sensor 504 and the object in the environment located at the X-Y location corresponding to the marking coordinate 700.

Figure 8:
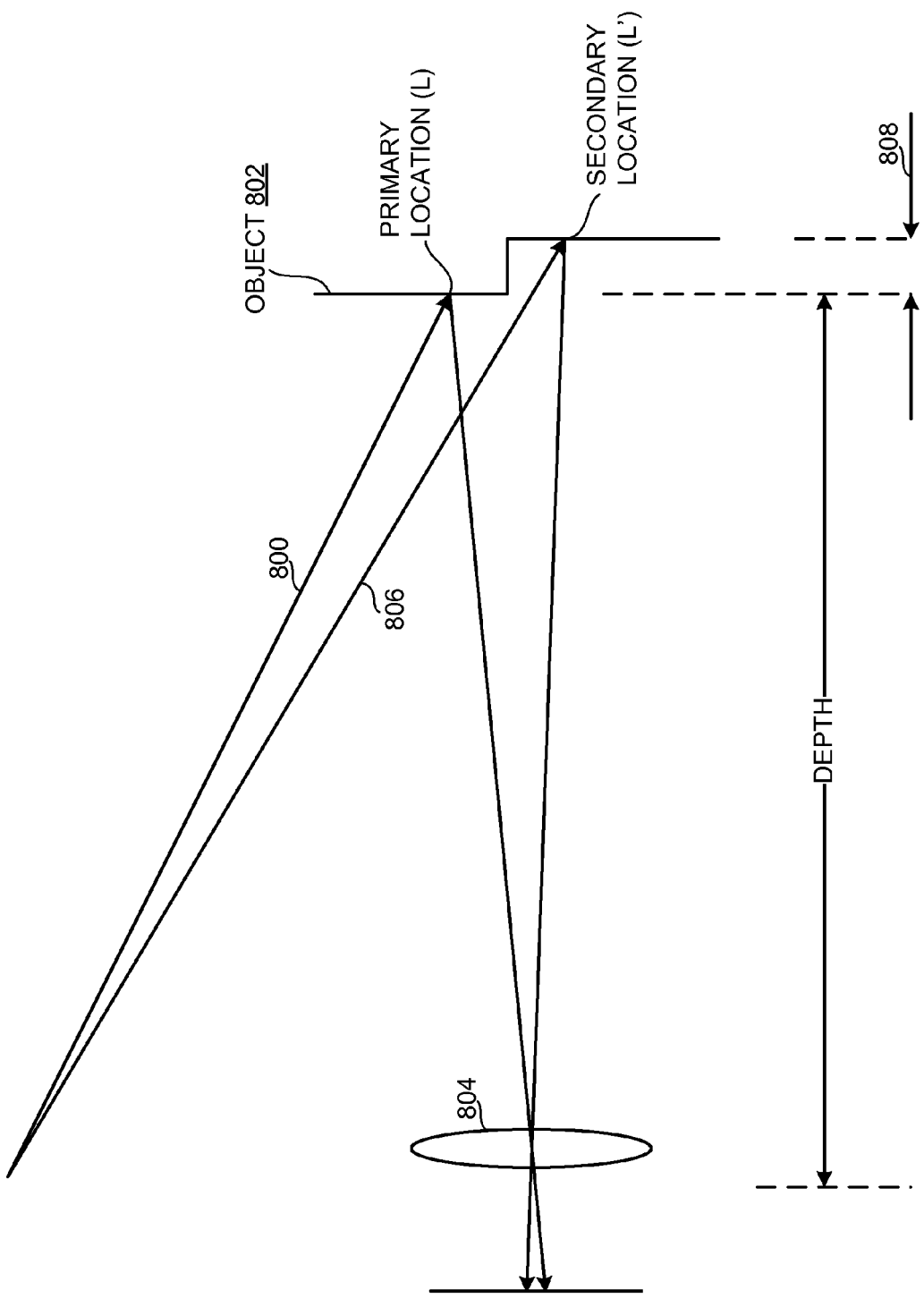
FIG. 8 is a diagram of example first and second rays projected into the example environment of FIGS. 1 and/or 4 by the example image capturing device of FIGS. 1, 2, 3, 4, and/or 5B.

FIG. 8 illustrates a first ray 800 projected into the environment 100 by the example depth sensor 504 of FIG. 5B that is incident on an object 802 of the environment 100. Assume, for purpose of this example, that the object 802 corresponds to an alleged person according to the person detector 610 located at the marking coordinate 700. The location on the object 802 at which the first ray 800 strikes the object 802 is referred to in FIG. 8 as the primary location (L) as it corresponds to the location on the object 802 that resulted in the primary depth value. As described above, the primary depth value resulted in triggering the depth gradient calculator 600 (e.g., because the primary depth value exceeded a threshold distance). The example depth sensor 504 includes one or more imaging lens(es) 804 that receives the reflection of the first ray 800. The angle at which the first ray 800 is received at the imaging lens 804 enables a processor associated with the depth sensor 504 to calculate the primary depth value.

Per the above, the primary depth value associated with the first ray 800 is received at the depth gradient calculator 600. The example depth gradient calculator 600 includes an angular position tracker 624 to record and maintain a list of angular positions at which the image capturing device 104 was oriented when corresponding image data was captured. The angular position tracker 624 records the baseline angular position of the image capturing device 104 for the received primary depth value received at the depth gradient calculator 600 because the first ray 800 of FIG. 8 was projected into the environment 100 with the image capturing device 104 aligned with the baseline angular position 110 of FIG. 1.

To generate more granular depth information for use by, for example, the recognizer 602, the example depth gradient calculator 600 causes the image capturing device 104 to rotate to one or more secondary angular positions 626 different than the baseline angular position 110 at which the primary depth value was captured. The secondary angular positions 626 of FIG. 6 include, for example, the first titled position 200 of FIG. 2 and the second tilted position 300 of FIG. 3. The example secondary angular positions 626 of FIG. 6 are predefined positions, each of which has a respective degree of difference (e.g., the first degree 202 of FIG. 2 and the second degree 302 of FIG. 3) known to the depth gradient calculator 600. In the illustrated example, the secondary angular positions 626 are achieved via a tilt motor employed by the image capturing device 104. The example depth gradient calculator 600 of FIG. 6 includes a rotator 628 to instruct the tilt motor of the image capturing device 104 to move the depth sensor 504 to one of the secondary angular positions 626 by, for example, rotating and/or tilting a housing in which the depth sensor 504 is deployed.

After the example rotator 628 causes the image capturing device 104 to be positioned in, for example, the first tilted position 200 of FIG. 2, the example depth gradient calculator 600 causes the depth sensor 504 to take a depth reading of the environment 100. In some examples, the depth sensor 504 captures depth data associated with the coordinate currently being analyzed by the example depth gradient calculator 600. Alternatively, the example depth sensor 504 can capture depth data associated with the entire environment 100 while positioned in the first tilted position 200. FIG. 8 includes a second ray 806 representative of the secondary depth reading caused by the example depth gradient calculator 600 with the image capturing device 104 in the first tilted position 200. The second ray 806 strikes the example object 802 of FIG. 8 at a secondary location (L') of the object different than the primary location (L) at which the first ray 800 struck the object 802. In the illustrated example, the secondary location (L') is located at a greater distance from the depth sensor 504 than the primary location (L). The difference between the depth of the primary location (L) and the secondary location (L') is referred to as the depth difference 808. A reflection of the second ray 806 is received at the imaging lens(es) 804 of the depth sensor 504 at a different angle than the reflection of the first ray 800. The example depth sensor 504 recognizes the depth difference 808 between the primary location (L) and the secondary location (L') due to the different angles at which the reflections of the first and second rays 800 and 806 are received at the imaging lens(es) 804.

While FIG. 8 illustrates the second ray 806 and the depth difference 808 generated by rotating the depth sensor 504 to the first tilted position 200 of FIG. 2, the example rotator 628 may cause the tilt motor of the image capturing device 104 to rotate the depth sensor 504 to one or more additional secondary angular positions 626 for an analysis of the same coordinate. In some examples, one or more of the additional secondary angular position(s) 626 correspond to tilted position(s) in the same direction 204 of the first tilted position 200 of FIG. 2. In some examples, one or more of the additional secondary angular position(s) 626 correspond to tilted position(s) in the opposite direction (e.g., the second direction 304 of FIG. 3).

The example depth gradient calculator 600 of FIG. 6 includes an accumulator 630 to calculate an accumulated value for the currently analyzed coordinate representative of a depth gradient at the currently analyzed coordinate. To calculate the depth gradient, the example accumulator 630 utilizes the primary depth value for the instant coordinate, the secondary depth value(s) captured with the image capturing device 104 oriented in the secondary angular position(s) 626, and the degree(s) of difference between the baseline angular position and the secondary angular position(s) 626. In the illustrated example, the accumulator 630 calculates the depth gradient according to the following equations. However, the example accumulator 630 can utilize any additional or alternative technique or algorithm to calculate the depth gradient for the analyzed coordinate. In the illustrated example of FIG. 8, the primary depth value is marked as (DEPTH), but may also be indicated as D in any equations or in the specification. In the illustrated example, D is significantly greater than the depth difference 808 (e.g., the distance between the primary location (L) and the secondary location (L')). In the illustrated example, the degree of difference between the baseline angular position and the secondary angular position of the depth sensor is represented by 'θ'. The example accumulator 630 of FIG. 6 uses the following equation to calculate an expected displacement (d) of the image of location L:

$$d = D\theta k,$$

where k is a magnification factor between the object 802 and image planes. The example accumulator 630 of FIG. 6 also calculates an observed displacement (d') using the following equation:

$$d' = (D + \partial)\theta k,$$

where ∂ is the depth change indicated by 808 in FIG. 8. In the illustrated example, when the primary distance is significantly greater than (e.g., beyond a threshold) the focal length of the imaging lens (f), $$k \cong \frac{f}{D}.$$

The example accumulator 630 calculates the depth gradient for the analyzed coordinate using the following equation:

$$\text{depth gradient} \approx \frac{\partial}{D\theta}.$$

The depth gradient value generated by the depth gradient calculator 600 provides additional information for the recognizer 602 for the coordinate(s) of interest. In some examples, the calculated depth gradient value is used to supplement and/or modify the primary depth value(s) associated with the coordinate(s) of interest to provide additional detail for the corresponding coordinate(s). With the depth gradient information and/or a supplemented and/or modified version of the primary depth value, the detectors 610-616 of the recognizer 602 are better able to generate accurate recognitions of, for example, people, gestures, identities, etc. As described above, the depth gradient calculator 600 is triggered for instances in which the recognizer 602 is analyzing objects that are outside a depth range for the depth sensor 504. In such instances, the depth gradient information provided by the depth gradient calculator 600 effectively extends the range of the depth sensor 504 such that accurate recognition results are generated for objects at greater distances from the depth sensor 504 could achieve alone.

While an example manner of implementing the people analyzer 508 of FIG. 5A is illustrated in FIG. 6, one or more of the elements, processes and/or devices illustrated in FIG. 6 may be combined, divided, re-arranged, omitted, eliminated and/or implemented in any other way. Further, the example depth gradient calculator 600, the example recognizer 602, the example body tracker 604, the example body counter 606, the example person detector 610, the example movement detector 612, the example gesture detector 614, the example identity detector 616, the example tilt trigger 618, the example depth comparator 620, the example angular position tracker 624, the example rotator 628, the example accumulator 630, and/or, more generally, the example people analyzer 508 of FIG. 6 may be implemented by hardware, software, firmware and/or any combination of hardware, software and/or firmware. Thus, for example, any of the example depth gradient calculator 600, the example recognizer 602, the example body tracker 604, the example body counter 606, the example person detector 610, the example movement detector 612, the example gesture detector 614, the example identity detector 616, the example tilt trigger 618, the example depth comparator 620, the example angular position tracker 624, the example rotator 628, the example accumulator 630, and/or, more generally, the example people analyzer 508 of FIG. 6 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example depth gradient calculator 600, the example recognizer 602, the example body tracker 604, the example body counter 606, the example person detector 610, the example movement detector 612, the example gesture detector 614, the example identity detector 616, the example tilt trigger 618, the example depth comparator 620, the example angular position tracker 624, the example rotator 628, the example accumulator 630, and/or, more generally, the example people analyzer 508 of FIG. 6 are hereby expressly defined to include a tangible computer readable storage device or storage disc such as a memory, DVD, CD, Blu-ray, etc. storing the software and/or firmware. Further still, the example people analyzer 508 of FIG. 6 may include one or more elements, processes and/or devices in addition to, or instead of, those illustrated in FIG. 6, and/or may include more than one of any or all of the illustrated elements, processes and devices.

Figure 9:
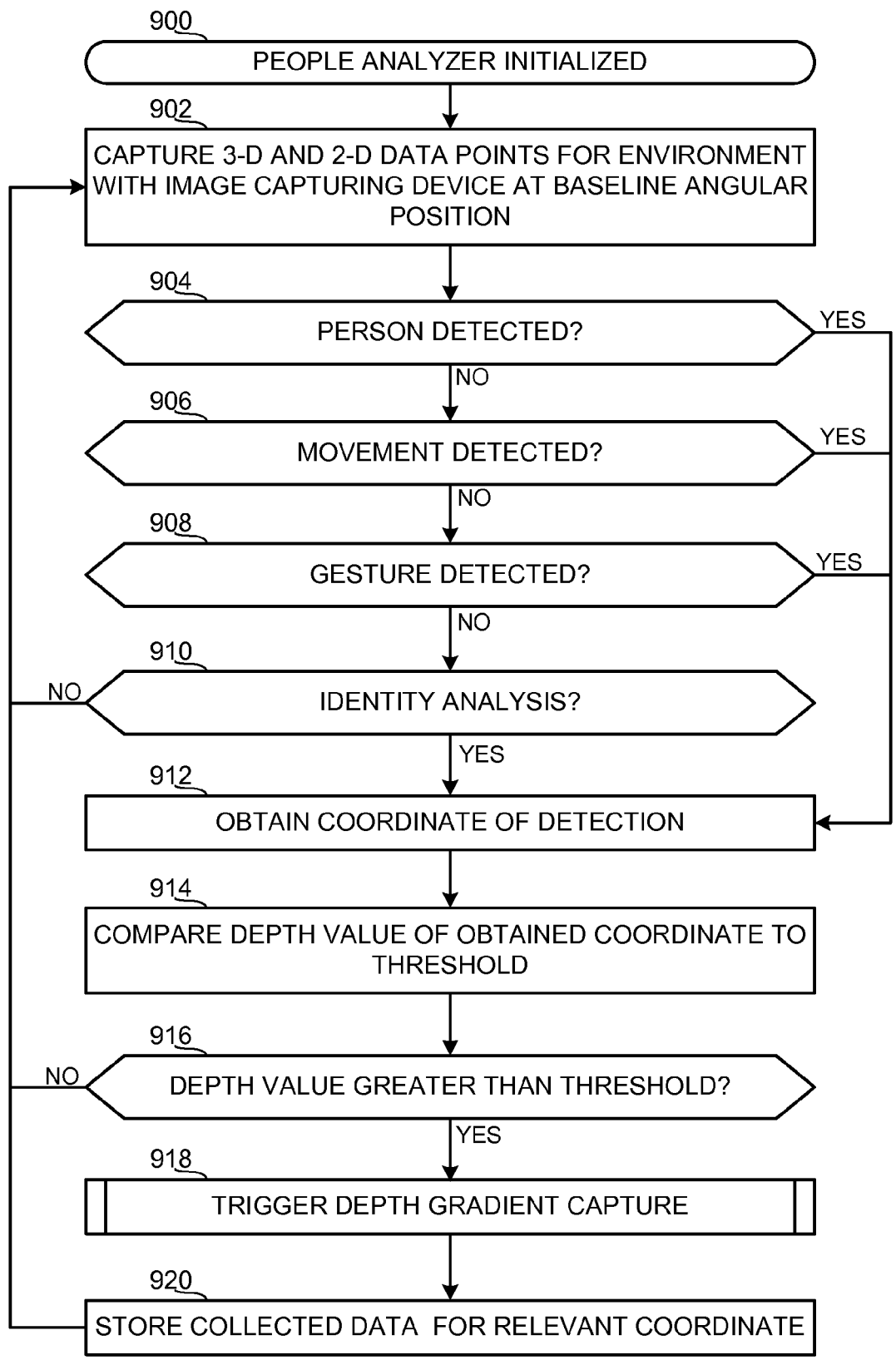
FIGS. 9 and 10 are flowcharts representative of example machine readable instructions that may be executed to implement the example people analyzer of FIGS. 5A and/or 6.
Figure 10:
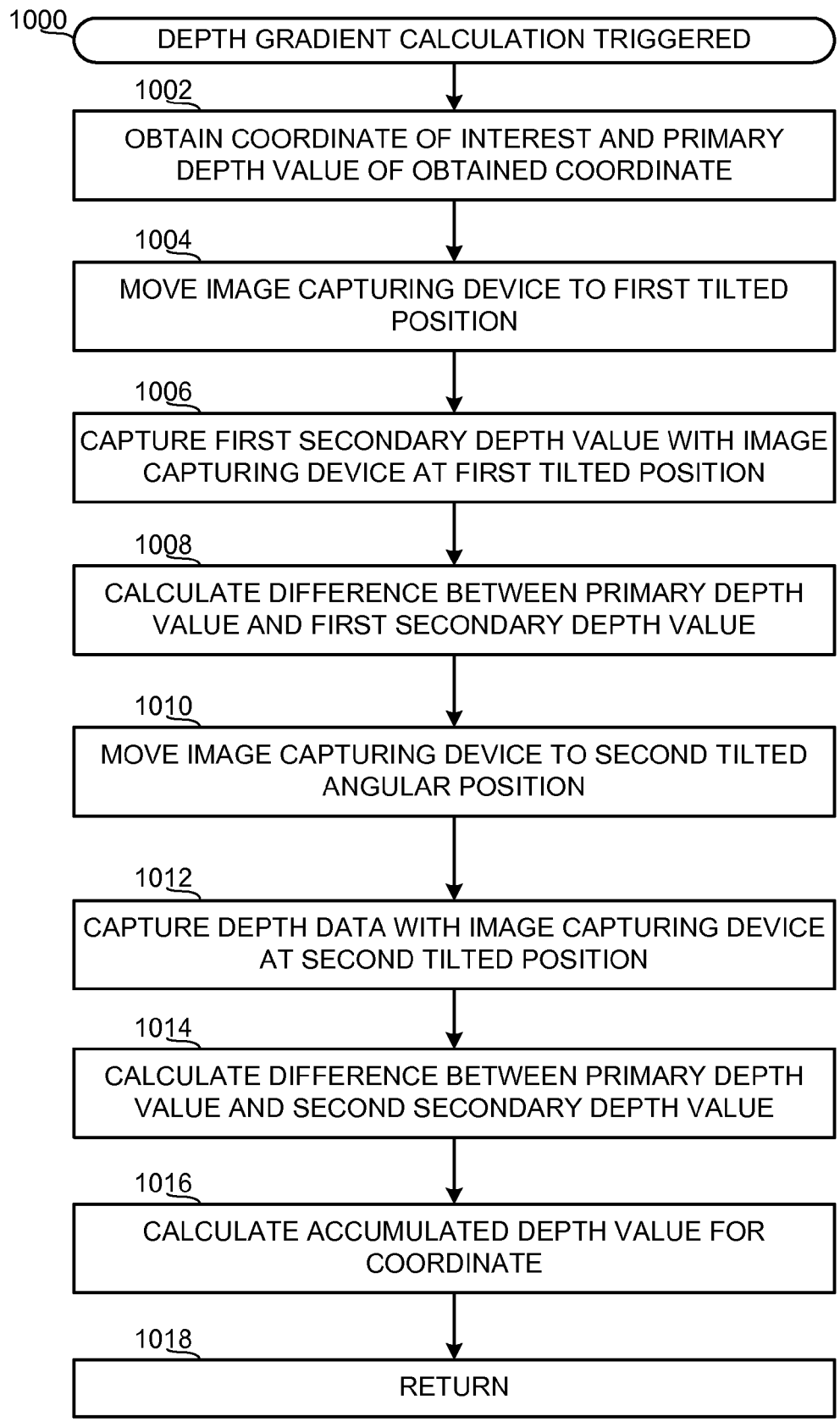

A flowchart representative of example machine readable instructions for implementing the people analyzer 508 of FIGS. 5A and/or 6 is shown in FIG. 9 and FIG. 10. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 9 and FIG. 10, many other methods of implementing the example people analyzer 508 may alternatively be used. For example, the order of execution of the blocks may be changed, and/or some of the blocks described may be changed, eliminated, or combined.

As mentioned above, the example processes of FIGS. 9 and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 9 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 9 begins with an initiation of the example people analyzer 508 of FIGS. 5A and/or 6 (block 900). The initiation of the people analyzer 508 coincides with, for example, activation of the information presentation device 102, the example meter 106, and/or the video game system 108 of FIG. 1. To begin analyzing the environment 100 of FIG. 1, the image capturing device 104 captures three-dimensional and two-dimensional image data representative of the environment 100 with the image capturing device 104 positioned in the baseline angular position 110 of FIG. 1 (block 902). With the example image capturing device 104 in the baseline angular position 110, the example depth sensor 504 of FIG. 5B generates the primary depth values for the coordinates of the environment 100. The example detectors 610-616 of the example recognizer 602 of FIG. 6 analyze the primary image data representative of the environment 100 to determine if any of the corresponding conditions are present in the environment 100. In particular, if the person detector 610 of FIG. 6 detects a person in the primary image data representative of the environment 100 (block 904), control passes to block 912. If the person detector 610 does not detect a person (block 904), the movement detector 612 of FIG. 6 determines if the primary image data representative of the environment 100 is indicative of movement (block 906). If movement is detected, control passes to block 912. If the movement detector 612 does not detect movement (block 906), the gesture detector 614 determines whether the primary image data representative of the environment 100 is indicative of a gesture being made (block 908). If a gesture is detected, control passes to block 912. If the gesture detector 614 does not detect a gesture (block 908), the identity detector 616 determines whether an identity recognition process (e.g., facial recognition) is needed, desired or being performed for the primary image data (block 910). If the identity recognition process is needed, desired, or being performed (block 910), control passes to block 912. If not, control passes to block 902 and another set of primary image data is captured by the image capturing device 104.

At block 912, the coordinate of the detection that caused control to pass to block 912 is obtained by the tilt trigger 618. The depth comparator 620 of the tilt trigger 618 obtains the appropriate one of the threshold distances 622 (e.g., based on which of the detectors 610-616 generated the current detection) for comparison to the primary depth value of the obtained coordinate (block 914). That is, the depth comparator 620 determines whether the object of the environment 100 corresponding to the current detection is greater than the appropriate one of the threshold distances 622. If the primary depth value of the coordinate of interest is less than (or equal to) the selected one of the threshold distances 622 (block 916), control passes to block 902 and another set of primary image data is captured. Otherwise, if the depth comparator 620 indicates that the primary depth value of the coordinate of interest is greater than the selected one of the threshold distances 622 (block 916), the tilt trigger 618 triggers a calculation of a depth gradient for the coordinate of interest (block 918). An example implementation of block 918 is described below in connection with FIG. 10. In the example of FIG. 9, the depth gradient calculated by the example depth gradient calculator 600 and additional information associated with the current iteration of the image capturing device 104 is stored (e.g., in the memory 512 of FIG. 5A). Control then passes to block 902 for another iteration of capturing primary image data.

FIG. 10 corresponds to a triggering of the depth gradient calculator 600 of FIG. 6 (block 1000). As described above, the depth gradient calculator 600 receives and/or otherwise obtains the coordinate that triggered the calculation of the depth gradient primary and the primary depth value for the obtained coordinate (block 1002). Further, the angular position tracker 624 records the baseline angular position 110 of the image capturing device 104 corresponding to the capture of the primary depth value. The rotator 628 references the secondary angular positions 626 to determine a first tilted position for capture of a first secondary depth value and causes the image capturing device 104 to move the depth sensor 504 to that tilted position (block 1004). In the illustrated example, the first tilted position to which the image capturing device 104 is rotated corresponds to the first tilted position 200 of FIG. 2, which positions the depth sensor 504 at an angle less than the baseline angular position 110. The depth sensor 504 captures a first secondary depth value for the coordinate of interest with the image capturing device 104 in the first tilted position 200 (block 1006). The accumulator 630 determines a difference (if any) between the primary depth value and the first secondary depth value (e.g., the difference 808 of FIG. 8) (block 1008).

The rotator 628 references the secondary angular positions 626 to determine a second tilted position for capture of a second secondary depth value and causes the image capturing device 104 to move the depth sensor 504 to that tilted position (block 1010). In the illustrated example, the second tilted position to which the image capturing device 104 is rotated corresponds to the second tilted position 300 of FIG. 3, which positions the depth sensor 504 at an angle greater than the baseline angular position 110. The depth sensor 504 captures a second secondary depth value for the coordinate of interest with the image capturing device 104 in the second tilted position 300 (block 1012). The accumulator 630 determines a difference (if any) between the primary depth value and the second secondary depth value (e.g., the difference 808 of FIG. 8) (block 1014).

The accumulator 630 uses the primary depth value, the first and secondary depth values, the difference between the primary depth value and the first secondary depth value, the difference between the primary depth value and the second secondary depth value, the baseline angular position 110, the first tilted position 200, the second tilted position 300, the degree 202 of difference between the baseline angular position 110 and the first tilted position 200, the degree 302 of difference between the baseline angular position 110 and the second tilted position 300, and/or any other suitable parameter and/or measurement to calculate an accumulated value for the coordinate of interest (block 1016). The accumulated value is representative of, for example, a depth gradient of an object located at the coordinate of interest. The example of FIG. 10 returns to, for example, block 920 of FIG. 9 (block 1018).

Figure 11:
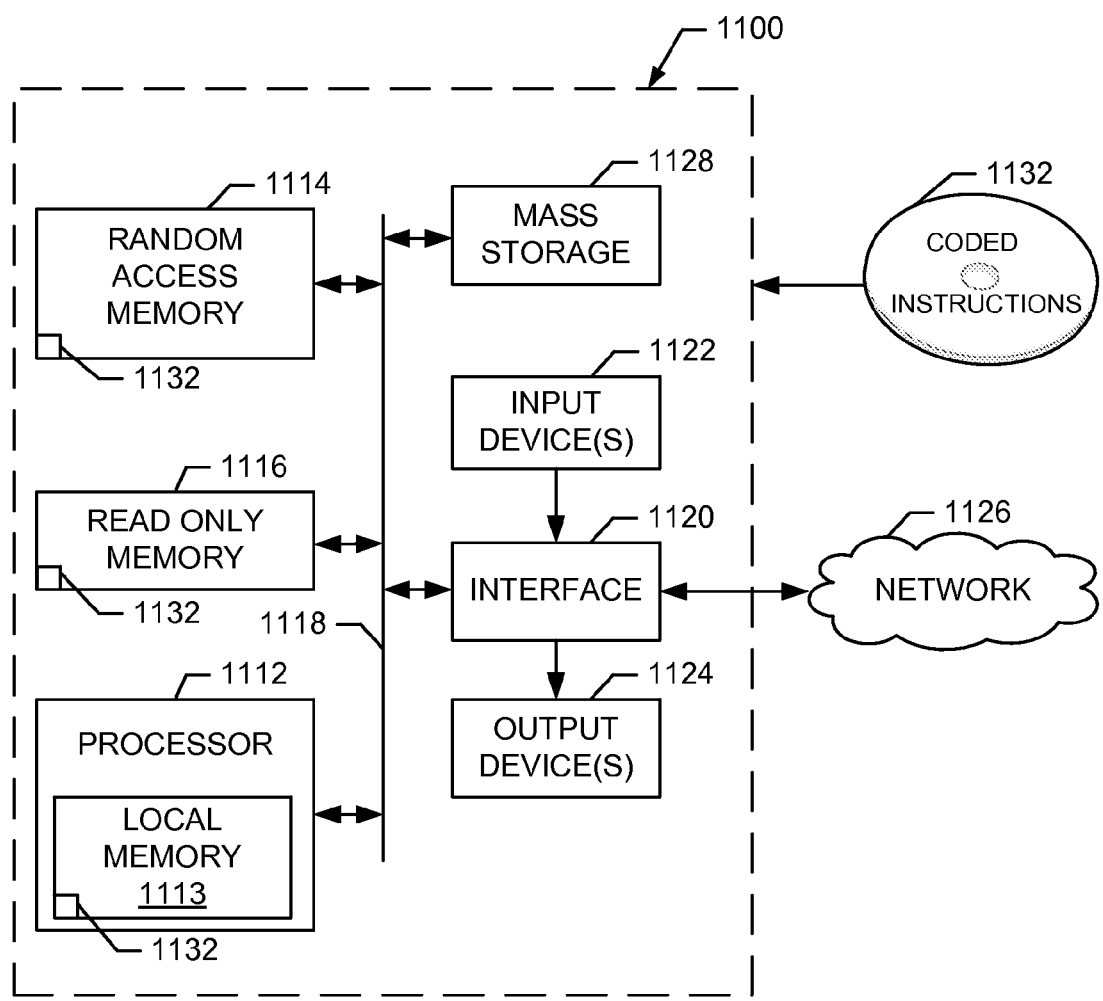
FIG. 11 is a block diagram of an example processing system capable of executing the example machine readable instructions of FIGS. 9 and/or 10 to implement the example people analyzer of FIGS. 5A and/or 6.

FIG. 11 is a block diagram of an example processor platform 1000 capable of executing the instructions of FIGS. 9 and/or 10 to implement the people analyzer 508 of FIGS. 5A and/or 6. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit a user to enter data and commands into the processor 1112. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 9 and/or 10 may be stored in the mass storage device 1128, in the volatile memory 1114, in the non-volatile memory 1116, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
    analyzing, with a processor, a first depth value corresponding to a coordinate of an object of an image captured by a depth sensor, the first depth value having been captured with the depth sensor positioned at a first angle relative to a reference axis;
    initiating, with the processor, the depth sensor to move to a second angle relative to the reference axis, the second angle being different than the first angle;
    triggering, with the processor, capture of a second depth value at the coordinate with the depth sensor positioned at the second angle; and
    calculating, with the processor, a depth gradient for the coordinate based on the first depth value, the second depth value, and a difference between the first angle and the second angle.

2. A method as defined in claim 1, wherein the moving of the depth sensor to the second angle is based on a comparison of the first depth value and a threshold.

3. A method as defined in claim 2, wherein a value of the threshold depends on whether the object, a movement, or a gesture is being analyzed.

4. A method as defined in claim 1, wherein the moving of the depth sensor to the second angle is in response to detecting movement at the coordinate.

5. A method as defined in claim 1, wherein the moving of the depth sensor includes actuating a tilt motor coupled to a housing of the depth sensor.

6. A method as defined in claim 1, further including triggering capture of a third depth value at the coordinate with the depth sensor positioned at a third angle relative to the reference axis, the third angle being different than the first and second angles.

7. A method as defined in claim 6, wherein the calculating of the depth gradient for the coordinate includes consideration of the third depth value.

8. A method as defined in claim 1, wherein the reference axis is a horizontal axis extending away from the depth sensor into the environment.

9. A tangible machine readable storage medium comprising instructions that, when executed, cause a machine to at least:
identify a first depth value corresponding to a coordinate of an object in a first image captured by a depth sensor, the first image having been captured with the depth sensor positioned at a first angle relative to a reference axis;
determine whether a condition associated with a recognition analysis is present at the coordinate; and
in response to the condition being present at the coordinate:
trigger capture of a second image at the coordinate with the depth sensor positioned at a second angle relative to the reference axis, the second angle being different than the first angle;
identify a second depth value corresponding to the coordinate of the object in the second image; and
calculate an accumulated value for the coordinate based on a difference between the first angle and the second angle and on a difference between the first and second depth values.

10. A storage medium as defined in claim 9, wherein the condition includes an indication that a person is detected at the coordinate at a distance from the depth sensor greater than a threshold distance associated with a person detector.

11. A storage medium as defined in claim 9, wherein the condition includes an indication that movement is detected at the coordinate at a distance from the depth sensor greater than a threshold distance associated with a movement detector.

12. A storage medium as defined in claim 9, wherein the condition includes an indication that a gesture is detected at the coordinate at a distance from the depth sensor greater than a threshold distance associated with a gesture detector.

13. A storage medium as defined in claim 9, wherein the instructions, when executed, cause the machine to identify a third depth value at the coordinate in a third image captured with the depth sensor positioned at a third angle relative to the reference axis, the third angle being different than the first and second angles.

14. A storage medium as defined in claim 13, wherein the instructions, when executed, cause the machine to calculate the accumulated value based on the first, second and third depth values.

15. An audience measurement device, comprising:
a recognizer to identify an object as likely being a person by analyzing data representative of an environment; and
a depth analyzer to, when a first depth value associated with a coordinate of the object captured by a depth sensor with the depth sensor oriented along a first axis is greater than a threshold distance from the depth sensor:
cause the depth sensor to capture a second depth value at the coordinate with the depth sensor positioned at a first tilt relative to the first axis; and
calculate an accumulated value for the coordinate based on (1) a comparison of the first depth value and the second depth value and (2) an angle of the first tilt;
at least one of the recognizer or the depth analyzer being implemented via a logic circuit.

16. An audience measurement device as defined in claim 15, wherein the angle is different than a baseline angle.

17. An audience measurement device as defined in claim 15, wherein the recognizer is to use the accumulated value to confirm that the object is a person.

18. An audience measurement device as defined in claim 15, wherein the depth analyzer is to actuate a tilt motor to move the depth sensor to the first tilt from the first axis.

19. An audience measurement device as defined in claim 15, wherein the angle is a particular number of degrees away from the first axis, the first axis extending away from the depth sensor.

20. An audience measurement device as defined in claim 15, wherein the depth sensor is to utilize a projected dot array, and a first dot of the dot array corresponds to the coordinate.

21. An apparatus, comprising:
a depth sensor to collect images of an environment, the depth sensor having a housing;
a tilt motor to tilt the housing of the depth sensor relative to a reference axis; and
a processor to:
determine a first depth value associated with a coordinate of a first image collected with the housing at a first angle relative to the reference axis;
instruct the tilt motor to move the housing to a second angle relative to the reference axis, the second angle being different from the first angle;
determine a second depth value associated with the coordinate in a second image collected by the depth sensor with the housing at the second angle; and
calculate a depth gradient for the coordinate based on the first depth value, the second depth value, and a difference between the first angle and the second angle.

22. A method, comprising:
analyzing, with a processor, a first depth value corresponding to a coordinate of an object of an image captured by a depth sensor, the first depth value having been captured with the depth sensor positioned at a first angle relative to a reference axis;
moving, with the processor, the depth sensor to a second angle relative to the reference axis, the second angle being different than the first angle;
triggering, with the processor, capture of a second depth value at the coordinate with the depth sensor positioned at the second angle; and
calculating, with the processor, a depth gradient for the coordinate based on the first depth value, the second depth value, and the second angle;
wherein the calculating of the depth gradient for the coordinate based on the first depth value, the second depth value, and the second angle includes:
calculating a first difference between the first depth and the second depth;
calculating a second difference between the first angle and the second angle; and
calculating a ratio of the first difference and the second difference.

* * * * *